No. 771,708. PATENTED OCT. 4, 1904.
L. W. CARDEN.
CATTLE GUARD.
APPLICATION FILED JUNE 6, 1904.
NO MODEL.
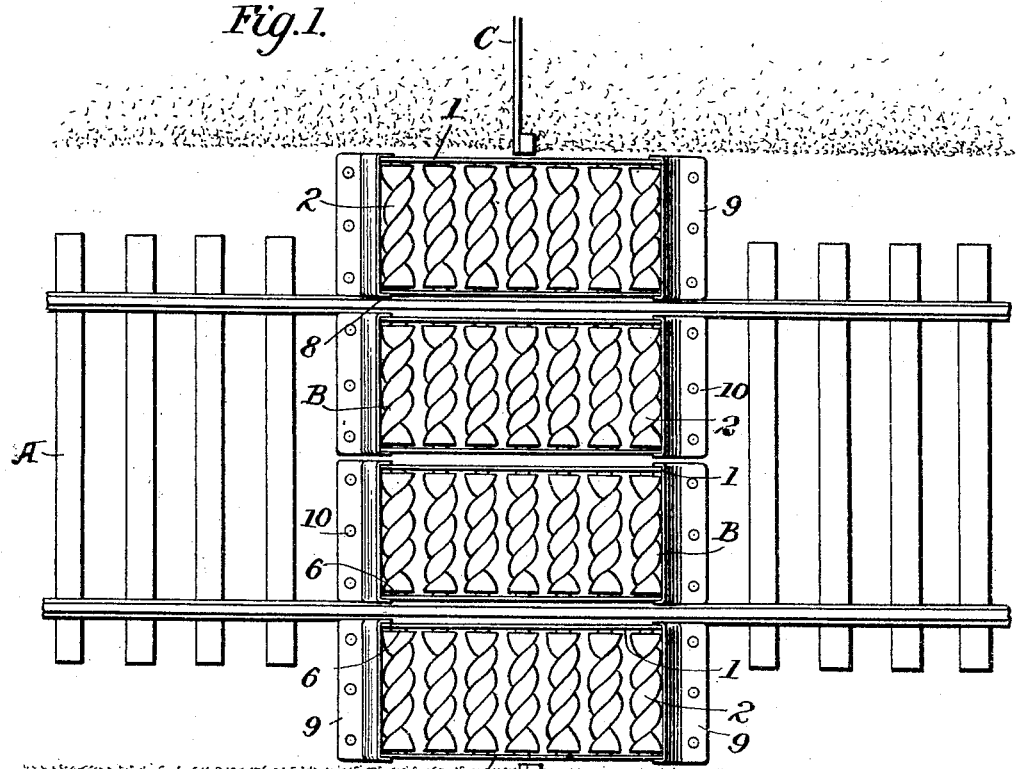
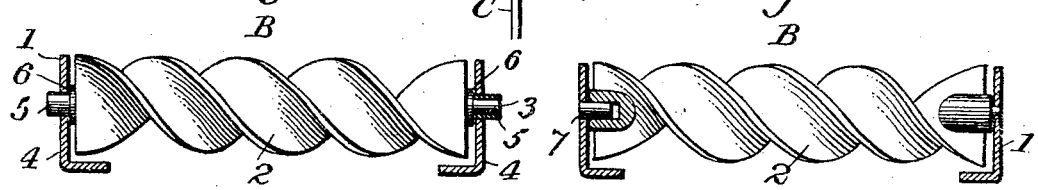
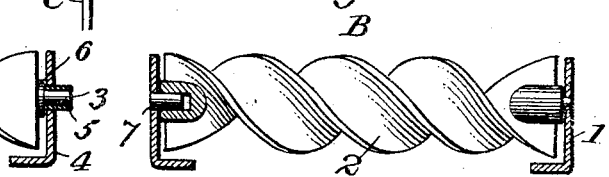
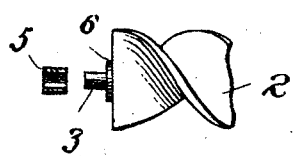
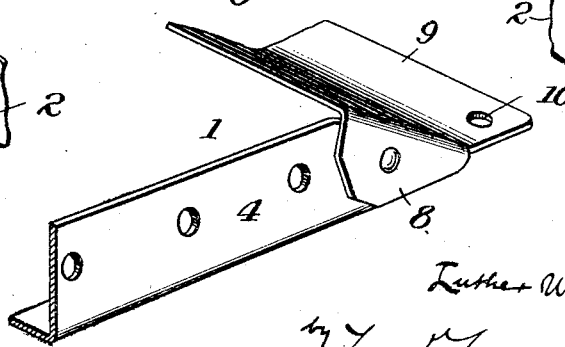
Witnesses
Inventor
Luther W. Carden,
Attorneys No. 771,708. Patented October 4, 1904.

UNITED STATES PATENT OFFICE.

LUTHER W. CARDEN, OF IRON CITY, TENNESSEE, ASSIGNOR OF ONE-FOURTH TO J. M. AND E. L. FORSYTHE, OF IRON CITY, TENNESSEE.

CATTLE-GUARD.

SPECIFICATION forming part of Letters Patent No. 771,708, dated October 4, 1904.

Application filed June 6, 1904. Serial No. 211,337. (No model.)

*To all whom it may concern:*

Be it known that I, LUTHER W. CARDEN, a citizen of the United States, residing at Iron City, in the county of Lawrence and State of Tennessee, have invented certain new and useful Improvements in Cattle-Guards, of which the following is a specification.

This invention relates to certain new and useful improvements in railway cattle-guards; and the invention consists in a guard composed of a series of screw-shaped or twisted bars arranged parallel to each other and suitably supported to rotate, as fully set forth hereinafter, and as illustrated in the accompanying drawings, in which—

Figure 1 is a plan view illustrating my improved cattle-guard arranged in the line of a railway. Fig. 2 is an enlarged transverse section of my cattle-guard; Fig. 3, a perspective view of one corner of the frame. Fig. 4 is a detail view, and Figs. 5 and 6 are views illustrating modifications.

Referring to the drawings, A represents a line of railway, B B the improved cattle-guard, and C C the ends of a fence which extends in opposite directions from the track.

As shown and preferred, the guard consists of four like sections arranged side by side, two sections occupying the space between the track-rails and one section lying outside of each rail, the sections forming a practically continuous guard-surface between the ends of the fence and throughout the area covered by the guard. It will be understood, however, that the guard-sections may be of any suitable size and be differently arranged and that the guard may be located at any point where it is desired to prevent the trespass of cattle or other stock.

Each cattle-guard or section thereof consists of a series of spiral rollers or screw-shaped or twisted bars 2, which are arranged parallel to each other and are suitably mounted so as to rotate freely on their longitudinal axes. These rollers or bars serve to cover practically the entire area occupied by the guard and are so close together that there is no substantial passage between them that will allow the feet of the cattle to pass down, while at the same time they do not afford any flat bearings at any points upon which a hoof can rest; furthermore, their rotation will prevent any fixed bearing for the hoof at any point. The rollers or bars 2 may be formed of cast metal or be made of flat plates or bars suitably twisted and are preferably supported by frames 1, in which the bars are arranged parallel, each bar having at each end a trunnion 3, extending through a side piece 4 of the frame, and a shoulder 6 to maintain the end of the bar properly spaced from the frame. In order to prevent noise from the rotating of the rollers or bars, each trunnion may be covered by a sleeve 5, of rubber or other elastic material.

Instead of having the trunnions formed on the rollers or bars and extending through the side pieces of the frame, as shown in Figs. 1 and 2, studs 7 may extend from the frame into recesses in the ends of the bars, as shown in Fig. 5. In the construction shown in Fig. 6 the trunnions are carried by caps 8, fitted over and firmly secured to the ends of the rollers 2.

While the frames may be made in any suitable manner, I prefer to make each side piece 4 out of an L-shaped bar and provide each end piece with ears 8, riveted or bolted to the adjacent side piece, and with a flange 9, having openings 10, through which the spikes may be driven to confine the frame to the cross-ties.

It will be seen that by forming the guard of a series of rotatable screw-shaped or twisted bars there is afforded no substantial support for snow to accumulate and that the structure is not likely to be blocked by ice or dust or mud. It will be obvious that the rollers or bars may be made of either metal or wood and that when of wood they may be shaped by carving or otherwise.

One great advantage which the spiral-shaped roller possesses over the plain or smooth roller in a guard of this character is that in case a cow or horse should get its hoof lodged in between the spiral rollers the latter by turning will provide a space sufficiently large to permit the withdrawal of the hoof, thereby giving the animal a chance to extricate itself, and thus possibly avoid a more serious accident.

Without limiting myself to the precise construction shown, I claim—

1. A railway cattle-guard consisting of a frame and a series of spiral rollers rotatably supported thereby, substantially as set forth.

2. The combination in a railway cattle-guard, of a series of parallel spiral rollers having end trunnions and a support therefor, substantially as set forth.

3. The combination in a railway cattle-guard, of a series of spiral rollers having end trunnions and arranged parallel to each other, and a frame having bearings for said trunnions, substantially as set forth.

4. The combination in a railway cattle-guard, of a series of parallel spiral rollers having end trunnions provided with elastic sleeves, and a support therefor, substantially as set forth.

5. The combination in a railway cattle-guard, of a series of parallel spiral rollers having trunnions and shoulders thereon and arranged parallel to each other, and a supporting-frame, substantially as set forth.

6. The combination in a railway cattle-guard, of a series of rotatable spiral rollers and a frame consisting of L-shaped side pieces and flanged end pieces, substantially as set forth.

In testimony whereof I have signed my name to this specification in the presence of two subscribing witnesses.

LUTHER W. CARDEN.

Witnesses:
W. M. SURAMY,
H. P. SEAVY.